Patented June 17, 1952

2,601,202

UNITED STATES PATENT OFFICE 2,601,202

ANION EXCHANGE RESINS AND PROCESS

William C. Bauman and George Beal Heusted, Midland, Mich., assignors to The Dow Chemical Company, Midland, Mich., a corporation of Delaware No Drawing. Application May 23, 1946, Serial No. 671,871

15 Claims. (Cl. 260—57)

This invention concerns certain new water-insoluble solid resins, containing basic nitrogen groups, and a method of making the same. It also concerns an ion exchange process wherein said resins are employed for the absorption of anions from solutions of acids in ionizing media.

The resinous anion exchange agents provided by the invention are reaction products of formaldehyde and an ammonia source-material, e. g. ammonium hydroxide or an ammonium salt, with a monohydric phenol initially having no substituents in at least two of the positions ortho and para to the phenolic hydroxyl group. They are prepared by heating an aqueous mixture of the reactants in the relative proportions hereinafter specified under conditions which, at least toward the close of the reaction, are acidic until a solid water-insoluble resinous product is formed. In order to obtain a product suitable for use as an anion exchange agent, it is important that such conditions be observed. Otherwise, little or none of the nitrogen of the ammonia, or ammonium salt, becomes chemically combined in the resin molecule, or the product formed possesses undesirable physical and chemical properties, such as mechanical weakness, or excessive shrinkage and swelling upon change of the pH value of liquids contacted therewith, etc., which render it poorly suited to use for anion exchange purposes.

In this connection it may be mentioned that it is, of course, well known to employ ammonia or ammonium salts as catalysts for the condensation of phenol and formaldehyde to form phenol-formaldehyde resins, but that the procedures and relative proportions of starting materials conventionally used are not such as to produce a product suitable for use as an anion exchange agent. Usually, the ammonia or ammonium salt is employed in catalytic amount and under conditions such that little or no nitrogen becomes chemically combined with the resin.

We have found that by employing as starting materials at least 2, usually between 2 and 3.5, gram molecular weights of formaldehyde, and ammonia or an ammonium salt in amount containing from 0.5 to 2 gram atomic weights of nitrogen per gram molecular weight of the phenolic reactant in the condensation reaction and by completing the reaction under acidic conditions, a solid water-insoluble resin is obtained which contains nitrogen in the form of basic nitrogen radicals, e. g. amino groups, and possesses satisfactory anion exchange properties such as good mechanical strength, ability readily to exchange anions, and only moderate swelling or shrinkage upon change of the pH value of aqueous media contacted therewith. Apparently, the resin contains the starting materials chemically combined within the limits of proportions just stated.

In order to cause chemical combination of a considerable amount of the nitrogen of the ammonia or ammonium salt in the resin molecule, it is necessary that the reaction to form the resin be completed under acidic conditions. The reaction may be started in an alkaline medium, or it may be conducted throughout under acidic conditions, as desired. The acid required for completion of the reaction under acidic conditions may be added as such, or at least a portion thereof may be formed in situ within the mixture. When using an ammonium salt, e. g. ammonium chloride or sulphate, as a starting material, the small amount of its ammonia content which tends to combine chemically with the other reactants releases from the salt a corresponding amount of acid which, in turn, apparently catalyzes further combination of ammonia in the resin molecule.

The anion exchange capacity of the resin is, of course, dependent upon the amount of nitrogen chemically combined as basic nitrogen radicals in the resin molecule. The proportions of ammonia, or ammonium salt, recommended above are those which under the reaction conditions of the invention result in formation of a resin of good exchange capacity. The mechanical strength and resistance to excessive swelling of the resin during use are dependent upon the relative proportions of the several starting materials, particularly the ratio of formaldehyde to the phenolic reactant.

As the phenolic reactant in preparing the resins, phenol itself is preferred, but other phenols such as cresol, chlorophenol, or ethylphenol, or mixtures of such phenolic compounds may be used. The formaldehyde is usually employed as an aqueous solution thereof, but it may be added in polymeric form, e. g. as paraformaldehyde. The ammonia reactant may be added in the form of an aqueous ammonia solution, or in gaseous form, but it is usually added in the form of an ammonium salt, e. g. ammonium chloride, ammonium bromide, ammonium sulphate, or ammonium acetate, etc. Apparently, any ammonium salt can be employed. Other ammonia source-materials such as sulphamic acid, which is hydrolyzable to form ammonia, may be used to supply the nitrogen content of the resin.

The several reactants in the aforestated proportions are dissolved in water or other ionizing liquid media, e. g. alcohol or an aqueous alcohol solution, and the mixture is heated at temperatures above 50° C., e. g. between 50° and 125° C., and usually under reflux at temperatures between 70° and 100° C., to effect the condensation reaction. The reaction mixture may initially be alkaline, neutral, or acidic, provided the reacting materials are retained in solution and the mixture is rendered strongly acidic prior to completion of the reaction. In this connection, it may be mentioned that the initial presence of an acid in high concentration, e. g. the presence of 50 per cent by weight or more of sulphuric acid, often causes premature coagulation of partially formed resinous material and is avoided. When the reaction is started under neutral, or slightly alkaline, conditions using an ammonium salt as the ammonia source-material, it usually becomes somewhat acidic due to decomposition of the salt and reaction of the ammonia content thereof in forming the resin. Acid thus formed, or added from an outside source, appears to catalyze the reaction for chemical combination of the ammonia in the resin molecule and also to cause an increase in the rate at which solidification and hardening of the resinous product occur. In general, an increase in the proportion of acid in the mixture results in an increase in the rate of solidification and hardening of the product.

The amount of acid formed in situ, due to employment of an ammonium salt as a starting material is usually not sufficient to cause solidification and hardening of the product as rapidly as desired. Accordingly, when the resin forming reaction has progressed to a stage at which the mixture is quite viscous, acid is preferably added to render it strongly acidic, e. g. of a degree of acidity greater than that represented by a pH value of zero. Any strong acid, such as hydrochloric, hydrobromic, or sulphuric acid, etc., may be used to acidify the reaction mixture. In order to obtain a uniform resinous product the mixture is cooled, e. g. to about 50° C. or lower, and the acid is added gradually and with stirring so as to avoid premature coagulation of resinous material. Certain acids, such as phosphoric acid, acetic acid, and particularly mixtures of acetic acid with phosphoric or sulphuric acid, have less tendency to cause premature coagulation of the product than other acids, e. g. hydrochloric or sulphuric acid alone, and are preferred. In practice, a mixture of about 80 per cent sulphuric acid and 20 per cent acetic acid is usually employed.

After acidifying the mixture as just described, the reaction is continued, usually at temperatures in the order of from 70° to 100° C., until a solid water-insoluble resinous gel is formed. The resinous product is ground, or otherwise pulverized, usually to form particles of from 20 to 60 mesh size. The granular material may be used directly as an anion exchange agent or it may first be dried, e. g. by heating at temperatures in the order of from 100° to 150° C.

In addition to the reactants hereinbefore specified, other materials may be present in the mixture from which the ion exchange resin is formed. For instance, organic amines, particularly alkylene-polyamines, may be present together with the ammonia or ammonium salt reactant, which feature of the invention is more specifically described and claimed in our copending application, Serial No. 671,872, filed concurrently herewith now Patent 2,546,938, issued March 27, 1951. Also, phenolic compounds other than those required by the invention, e. g. polyhydric phenols or monohydric phenols containing substituents in two of the positions ortho and para to the hydroxyl radical may be present in amount corresponding to less than 10 per cent of the weight of the phenolic reactant required. More important, usual fillers, such as asbestos fibers, or diatomaceous earth, etc., may be present in minor amount for purpose of increasing the porosity of the resinous product and the readiness with which the latter may exchange anions. Such addition of filler reduces the total anion absorptive capacity per cubic foot of the granular product, but it usually causes an increase in the anion exchange capacity available for use in a water purification process. Although the resinous product may be modified in such ways, it is important that the reactants and reaction conditions hereinbefore specified be employed.

The resinous product may be employed to absorb anions from solutions of acids, or of acids and salts, in ionizing media such as water or alcohol. It is particularly effectvie in absorbing mineral acids such as hydrochloric, sulphuric, hydrofluoric, or fluosilicic acid, etc., from aqueous solutions thereof. Usually, the absorption is effected by passing the solution through a bed of the granular resin, but it may be accomplished by other procedures known to the art. The new anion exchange resin may be used in conjunction with conventional cation exchange agents to effect substantially complete purification of water which initially contains acids, salts, or alkalies. In such complete purification operation the impure water is passed first through a bed of the acidic form of a granular cation exchange agent, whereby positive ions are absorbed from the water leaving the latter substantially free of impurities other than acids. The water is then passed through a bed of the granular anion exchange agent, which combines chemically with, and thus absorbs, the acids.

After having absorbed its capacity of anions during use in such ion exchange process, the anion exchange resin may be regenerated by treatment with an aqueous solution of an alkali such as ammonium hydroxide, sodium hydroxide, potassium hydroxide, sodium carbonate, or potassium carbonate, etc. When an unstable acid such as fluosilicic acid, susceptible to decomposition by strong alkalies, has been absorbed by the resin, it is sometimes advisable to displace the unstable acid from the resin by treatment of the latter with a relatively stable aqueous acid such as hydrochloric or sulphuric acid, prior to treatment of the resin with an alkali. The regenerated resin is suitable for reemployment as an anion exchange agent.

The following examples describe certain ways in which the principle of the invention has been applied, but are not to be contrued as limiting the invention.

EXAMPLE 1

In each of three experiments, an aqueous mixture of phenol, formaldehyde, and ammonium sulphate in the moleculor proportions given in the following table was heated at temperatures in the order of from 80° to 95° C. The formaldehyde and water were supplied by employment of the formaldehyde as an aqueous solution of 37 per cent by weight concentration. After one hour of heating, the mixture was acidified by successively adding 0.25 molecular equivalent of acetic acid and a solution of approximately 80 per cent sulphuric acid and 20 per cent acetic acid in amount corresponding to about one molecular equivalent of the two acids per mole of the phenol reactant. Heating at a temperature of about 80° C. was continued for between 5 and 15 hours. The mixture was thereby converted to a hard resin. The resin was cooled, ground to particles of from 20 to 60 mesh size, and the granular material was dried by heating at a temperature of 150° C. for 3 hours. Each product was immersed in an excess of a dilute aqueous ammonium hydroxide solution for about 3 hours so as to convert it to its basic form and thereafter washed thoroughly with water. It was then immersed in water, the volume of the resin bed was noted and a measured amount of hydrochloric acid, sufficient to render the mixture acidic, was added. The acidified mixture was permitted to stand for about 3 hours, the amount by which the resin was swelled due to addition of the acid being noted. Excess hydrochloric acid was removed from the resin, i. e. by draining and washing with water, and the amount thereof measured. From the amount of acid added to the resin and the excess acid thereafter removed, the amount of acid absorbed and retained in chemical combination with the resin was calculated. Table I gives the molecular proportions of phenol, formaldehyde and ammonium sulphate used in making the resin, the per cent by which a bed of the wetted resin was swelled upon treatment with the hydrochloric acid, and the anion absorptive capacity of the resin as gram molecular weights of hydrochloric acid absorbed per liter of the water-wetted bed of granular resin.

*Table I*

| Resin Prepared From— | | | Properties of Resin | |
|---|---|---|---|---|
| Phenol Moles | Ammonium Sulphate Moles | Formaldehyde Moles | Per cent Swelling | Capacity Moles HCl/Liter |
| 1 | 0.5 | 2.25 | 1.5 | 1.14 |
| 1 | 0.5 | 2.5 | 9 | 1.58 |
| 1 | 0.5 | 3.25 | 24.5 | 2.10 |

It will be noted that an increase in the proportion of formaldehyde from 2.25 to 3.25 molecular equivalents per mole of the phenol used in making the resins resulted both in an increase in absorptive capacity and in an increase in the amount by which the resins are swelled upon treatment with acid.

EXAMPLE 2

By procedure similar to that described in Example 1, mixtures of phenol, formaldehyde and ammonium hydroxide were reacted, first under alkaline conditions and thereafter in the presence of phosphoric acid, and the resultant resinous product was converted to its basic form and tested to determine its absorptive capacity toward hydrochloric acid and the per cent by which the water-wetted resin is swelled upon treatment with the acid. Table II gives the molecular proportions of the reactants used in making each resin and its absorptive capacity and swelling characteristic.

*Table II*

| Resin Prepared From— | | | Properties of Resin | |
|---|---|---|---|---|
| Phenol Moles | Formaldehyde Moles | NH4OH Moles | Per cent Swelling | Capacity Moles HCl/Liter |
| 1 | 2.5 | 1 | 11 | 1.67 |
| 1 | 2.5 | 2 | 50 | 1.66 |

It will be noted that increase of from 1 to 2 molecular equivalents of ammonia per mole of phenol in preparation of the resins resulted in a considerable increase in the amount by which the resins are swollen upon treatment with acid and in no appreciable change in the absorptive capacity of the resins toward acids.

EXAMPLE 3

The general procedure of Example 1 was applied in reacting phenol and formaldehyde with each of several ammonia source-materials and in testing the swelling characteristic and absorptive capacity toward acid of each resultant resin. Table III names and gives the molecular proportions of the reactants used in making each resin. It also gives the per cent by which a bed of the granular water-wetted resin is swollen upon treatment with hydrochloric acid and the absorptive capacity of the resin for the acid.

*Table III*

| Resin Prepared From— | | | | Properties of Resin | |
|---|---|---|---|---|---|
| Phenol Moles | Formaldehyde Moles | NH3 Source-Material | | Percent Swelling | Capacity Moles HCl/Liter |
| | | Kind | Moles | | |
| 1 | 2.5 | $(NH_4)_2SO_4$ | 0.5 | 16 | 1.58 |
| 1 | 2.5 | $(NH_4)_2HPO_4$ | 0.5 | 40 | 1.55 |
| 1 | 2.5 | $HSO_3NH_2$ | 0.5 | 0 | 1.46 |
| 1 | 2.5 | $NH_4SO_3NH_2$ | 0.5 | 20 | 1.67 |

EXAMPLE 4

A mixture of 94 grams of phenol, 263 grams of an aqueous formaldehyde solution of 37 per cent concentration and 66 grams of ammonium sulphate was heated to 80° C., whereupon the temperature rose spontaneously to 95° C. Without further external heating the mixture was permitted to stand under reflux for about 1 hour, during which time the temperature decreased to 80° C. There were successively added 10 cubic centimeters of glacial acetic acid and 75 cubic centimeters of a solution of 80 per cent by weight sulphuric acid, 13 per cent acetic acid and 7 per cent water. During addition of the acids, the mixture heated spontaneously to 90° C. The hot mixture was permitted to stand in a thermally insulated vessel until it was converted to a solid resinous mass. The product was ground to particles of from 16 to 60 mesh size and the granular material was dried by heating at 150° C. for about 3 hours. It was then treated with an ammonium hydroxide solution to convert it to its basic form, washed with water, and tested as in the preceding examples to determine its swelling characteristic and its anion absorptive capacity. On treatment of a bed of the basic form of the granular resin, immersed in water, with an excess of hydrochloric acid the resin bed swelled to an extent of 38 per cent. The absorptive capacity of the resin for anions was chemically equivalent to 60,000 grains of calcium carbonate per cubic foot of the water-wet bed of resin.

EXAMPLE 5

Although the resins provided by the invention have high absorptive capacities for anions, the granules thereof are quite dense and penetration of the same with water is slower than desired. As a result, in an ion exchange process wherein the liquid to be purified is passed in steady flow through a bed of the granular resin, anionic impurities, e. g. acids, usually appear in the effluent liquor before the resin has absorbed its full capacity of anions and the full absorptive capacity of the resins is not realized. For purpose of overcoming this difficulty, several batches of resin were prepared by procedure similar to that of Example 4, except that in certain instances the respective fillers named in the following table, in the proportions also given, were admixed with the resin-forming mixture when in the form of a viscous liquid and before it had set to a solid resin. Each product was ground, converted to its basic form, and tested to determine its full anion absorptive capacity, as in the preceding examples. Each product was then employed in a water purification process which was carried out as follows. River water, containing salts such as sodium chloride, calcium chloride, magnesium chloride, etc., was passed in steady flow first through a bed of a usual cation exchange agent in its acid form and then through a bed of the basic form of the granular anion exchange agent prepared as just described. Flow of the water was continued until there was a sharp increase in the anion-content of the effluent water. The quantity of anions taken up by the anion exchange agent prior to the increase in the anion-content of the effluent water was determined. The cation exchange agent was regenerated in conventional manner by treatment with an aqueous mineral acid solution and the anion exchange resin was regenerated by treatment with an aqueous ammonium hydroxide solution of 2 per cent concentration. Both ion exchange agents were washed free of the regenerating material. With certain of the anion exchange agents, the cycle of water-treating operations just described was repeated one or more times for purpose of determining the operative anion exchange capacity of the anion exchange agent in successive cycles of the water-purification process. The following table names and gives the per cent by weight of the finely divided filler incorporated in a reaction mixture during preparation of each resinous product employed in the tests just described. It gives the full anion-absorptive capacity of the product and also the "operating" absorptive capacity displayed by the resin prior to the increase in anion-content of effluent water in each of successive cycles of the above-mentioned water-purification process as carried out with a given anion exchange agent. The anion-absorptive capacities are expressed in terms of grains of calcium carbonate per cubic foot of the water-wet bed of the anion exchange agent.

Table IV

| Cycle No. | Filler | | Capacity-Gr CaCO₃/Cu. Ft. | |
|---|---|---|---|---|
| | Kind | Per Cent | Operating | Full |
| 1 | None | 0 | 22,260 | 48,800 |
| 2 | do | 0 | 17,260 | |
| 3 | do | 0 | 12,700 | |
| 1 | Asbestos | 6 | 26,000 | 46,200 |
| 2 | do | 6 | 32,500 | |
| 3 | do | 6 | 27,800 | |
| 1 | Wood Flour | 10 | 30,000 | 33,220 |
| 2 | do | 10 | 26,000 | |
| 1 | Diatomaceous Earth | 20 | 29,100 | 39,880 |

Other modes of applying the principle of the invention may be employed instead of those explained, change being made as regards the method or anion exchange agents herein disclosed, provided the steps or ingredients stated by any of the following claims, or the equivalents of such stated steps or ingredients be employed.

We therefore particularly point out and distinctly claim as our invention:

1. A solid resin, substantially insoluble in water and in aqueous mineral acid solutions and adapted to employment as an anion exchange agent, which resin is prepared by reacting together in the presence of an ionizing solvent and at temperatures between 50° and 125° C., one molecular equivalent of a monohydric phenol, that of itself is free of substituents in at least two of the positions ortho and para to the hydroxyl group, from 2 to 3.5 molecular equivalents of formaldehyde and from 0.5 to 2 molecular equivalents of ammonia, and completing the resin-forming reaction under acidic conditions.

2. A solid resin, substantially insoluble in water and in aqueous mineral acid solutions and adapted to employment as an anion exchange agent, which resin is prepared by reacting together in the presence of an ionizing solvent and at temperatures between 50° and 125° C., one molecular equivalent of phenol, from 2 to 3.5 molecular equivalents of formaldehyde and from 0.5 to 2 molecular equivalents of ammonia, and completing the resin-forming reaction under acidic conditions.

3. A solid resinous product, as described in claim 1, having a finely divided solid filler incorporated therewith.

4. A solid resinous product, as described in claim 2, having a finely divided solid filler incorporated therewith.

5. A method of making a resin, adapted for employment as an anion exchange agent, which consists in reacting together, in the presence of an ionizing solvent and at temperatures between 50° and 125° C., 1 molecular equivalent of a monohydric phenol which initially is free of substituents in at least two of the positions ortho and para to the hydroxyl group, from 2 to 3.5 molecular equivalents of formaldehyde, and an ammonia source-material in amount corresponding to between 0.5 and 2 molecular equivalents of ammonia, and completing the resin-forming reaction under acidic conditions.

6. A method as described in claim 5, wherein the phenolic reactant is phenol and the ammonia source-material is an aqueous ammonium hydroxide solution.

7. A method as described in claim 5, wherein the phenolic reactant is phenol and the ammonia source-material is an ammonium salt.

8. A method as described in claim 5, wherein the phenolic reactant is phenol and the ammonia source-material is sulphamic acid.

9. A method of making a resin, adapted for employment as an anion exchange agent, which consists in reacting together at temperatures between 50° and 125° C. and in the presence of water, 1 molecular equivalent of a monohydric phenol which initially is free of substituents in at least two of the positions ortho and para to the hydroxyl group, between 2 and 3.5 molecular equivalents of formaldehyde, and an ammonia source-material in amount corresponding to between 0.5 and 2 molecular equivalents of ammonia, and completing the resin-forming reaction under acidic conditions.

10. A method as described in claim 9, wherein the phenolic reactant is phenol and the ammonia source-material is an aqueous ammonia solution.

11. A method as described in claim 9, wherein the phenolic reactant is phenol, the ammonia source-material is an aqueous ammonium hydroxide solution and, prior to formation of a solid resin, a finely divided solid filler is added.

12. A method as described in claim 9, wherein the phenolic reactant is phenol and the ammonia source-material is an ammonium salt.

13. A method as described in claim 9, wherein the phenolic reactant is phenol, the ammonia source-material is an ammonium salt and, prior to formation of a solid resin, a finely divided solid filler and a mixture of a major proportion by weight of sulphuric acid and a minor proportion of acetic acid are added, the acids being added in amount sufficient to render the reaction mixture acidic.

14. A method as described in claim 9, wherein the phenolic reactant is phenol and the ammonia source-material is sulphamic acid.

15. A method as described in claim 9, wherein the phenolic reactant is phenol, the ammonia source-material is sulphamic acid and, prior to formation of a solid resin, a finely divided solid filler and a mixture of a major proportion by weight of sulphuric acid and a minor proportion of acetic acid are added.

WILLIAM C. BAUMAN.
GEORGE BEAL HEUSTED.

REFERENCES CITED

The following references are of record in the file of this patent:

UNITED STATES PATENTS

| Number | Name | Date |
|---|---|---|
| 2,013,523 | Novak | Sept. 3, 1935 |
| 2,165,852 | Harmon | July 11, 1939 |
| 2,168,335 | Heckert | Aug. 8, 1939 |
| 2,341,907 | Cheetham | Feb. 15, 1944 |

FOREIGN PATENTS

| Number | Country | Date |
|---|---|---|
| 686,988 | Germany | Jan. 20, 1940 |